Sept. 29, 1953     A. R. BRADLEY     2,653,408
FISHING LURE
Filed Feb. 4, 1952

INVENTOR.
AURA R. BRADLEY
BY
*Milburn & Milburn*
ATTORNEYS

Patented Sept. 29, 1953

2,653,408

UNITED STATES PATENT OFFICE 2,653,408

FISHING LURE

Aura R. Bradley, Berea, Ohio

Application February 4, 1952, Serial No. 269,790

3 Claims. (Cl. 43—42.12)

The present invention relates to the general art of fishing lures.

In a general way, the object of my present invention is to provide a lure that affords an increased attraction for the fish; that is substantially snag-proof and weed-proof; that will lessen the danger of tangling or twisting of the line while in use; and that can be manufactured and sold at a reasonable price.

More specifically, one object of my present invention is to devise a lure that comprises an improved combination of inner and outer elements that are freely mounted in true balance for independent, individual rotation about the same longitudinal axis and that are so constructed and arranged as to rotate in opposite directions so as to thereby create a heightened attraction for the fish.

Another more specific object is to devise a lure that comprises the combination of a propeller form of member mounted for rotation about the longitudinal axis, and an outer closed loop form of screw member that is mounted for rotation in the opposite direction about the same axis and that is adapted to encompass the propeller member during actual operation of the device so as to afford the further advantage of rendering the lure practically snag-proof and weed-proof in addition to the heightened luring effect.

Another more specific object is to devise such a lure which is so weighted with respect to the longitudinal axis of the same that it may utilize the force of gravity in holding the longitudinal shaft of the lure against rotation, thereby providing a further means of lessening the danger of twisting or tangling of the line while in use.

Other objects will appear from the following description and claims when considered together with the accompanying drawing.

It is to be understood that the present form of disclosure is merely for illustration and that there might be devised various modifications thereof without departing from the spirit of my present invention as herein set forth and claimed.

Referring now in detail to the accompanying drawing, the substantially rigid shaft I is connected at its forward end to a conventional swivel 2 which in turn is connected to the line 3; and the shaft I, which is formed of wire, is provided at its rear end with the disengageable loop 4 for removable attachment of the hooks 5, according to the present illustration. Upon the forward end of shaft I there is fixedly mounted the imitation fish head 6 by extending the end portion of the shaft therethrough, bending it back downwardly through the lower part of the fish head 6 and then securing the shaft end to the shaft as for instance by soldering. The fish head 6 is so mounted that the greater part of its weight and that of the bent wire through the fish head 6 are off-centre so as to utilize the force of gravity in further preventing shaft I from turning about its longitudinal axis. The off-centre weight of the fish head 6 and its mounting means will supplement the swivel 2 in preventing rotation of shaft I. The artificial fish head 6 or at least its outer surface may be of a luminous character so as to prove even more alluring to the fish.

Figure 1:
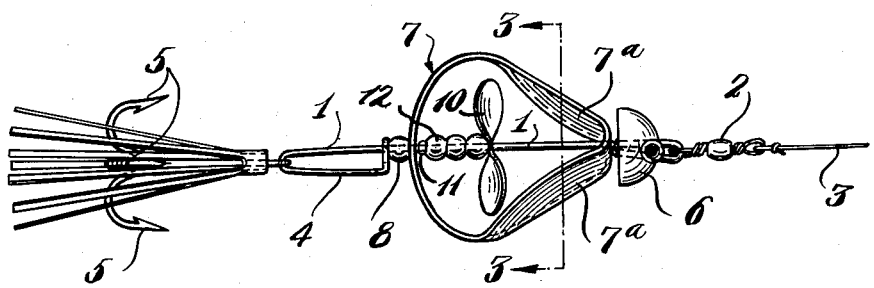
Fig. 1 is an elevational view of my improved lure.
Figure 2:
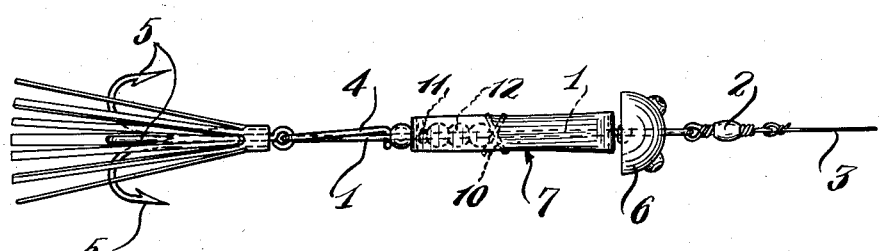
Fig. 2 is another elevational view of the same at ninety degrees to the view in Fig. 1.
Figure 3:
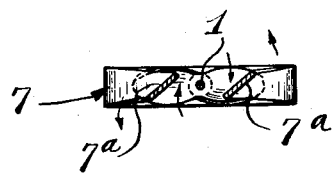
Fig. 3 is a sectional view taken on line 3—3 of Fig. 1.

The member 7 is freely rotatable upon the shaft I and may consist of a continuously integral closed loop of metal of suitable width and tapered towards the forward end thereof, such tapered or inclined portions being twisted into substantially screw form, as indicated by reference numeral 7a, so as to cause the same to rotate about the shaft I when trolled or retrieved in the water. Member 7 may be made from light metal tubing as a matter of convenience. The maximum width or transverse measurement of loop member 7 is, in the present illustration, at a point just rearward of the middle thereof, and its rear end is of a smooth or continuous curvature so that the general form of this element 7, in the specific illustration here shown, may be considered to resemble somewhat that of a pear. At the point that might be regarded as the point of tangency at the rear end of the member 7, it is adapted to have bearing engagement against a spherical bead 8 which is threaded diametrically for rotation upon shaft I, this bead being adapted for engagement at its diametrically opposite point with the forward end of the looped portion 4. With this arrangement, which serves virtually as a ball bearing, any frictional resistance to the rotation of member 7 is reduced to a minimum. There is sufficient clearance between the shaft I and the openings in the ends of the member 7 to permit freedom of rotation thereof upon the shaft I. Also, as indicated in the accompanying illustration (Fig. 1), the screw member 7 is of symmetrical form longitudinally and is mounted in a symmetrical manner upon the shaft I so as to contribute to the freedom of rotative movement and also to balance the screw member 7 thereupon; and there will be provided sufficient clearance between the forward or smaller end of the screw member 7 and the imitation fish head 6 so as to preclude any frictional resistance at this point to the rotation of the member 7 as the lure is trolled or retrieved through the water. In order to heighten still further the effective manner in which the member 7 may be rotated about the shaft 1 as the lure is moved through the water, I have made the material of this member of slightly decreasing width from the forward end toward the rear end thereof, as indicated in Fig. 2 of the present drawing.

Rotatably mounted upon the shaft 1 there is the propeller-like element 10 that is formed so as to rotate in a direction opposite to that of the member 7 when the lure is trolled or retrieved through the water. An abutment 11 is formed upon the shaft 1 by means of solder or in any other suitable manner at a point slightly forward of the rear end of the member 7 when contacting the bead 8, and a suitable number of spherical beads 12 are threaded diametrically so as to be rotatably free upon the shaft 1 just forward of the abutment 11 so as to provide a virtual ball bearing for the propeller 10, allowing proper clearance of the propeller 10 within the screw member 7 for free rotation upon the shaft 1. With this arrangement there will be no interference between the members 7 and 10 in their individual rotations in opposite directions upon the same shaft 1. Also, the element 10 is of such relative length as to allow proper clearance between its ends and the side portions of the screw member 7; and the maximum width of the blade of the propeller member 10 may be substantially the same as or slightly greater than that of the material of which the screw member is formed.

Thus my present lure consists of a screw form of outer member 7 and a propeller form of member mounted therewithin so as to be encompassed thereby, that is within the path described by the screw member 7 during actual operation of the lure; these two members 7 and 10 being so constructed and arranged that they will rotate in opposite directions upon the same shaft 1 as the lure is trolled or retrieved in the water. Such combined action may be produced without either of these two rotatable elements interfering with the rotation of the other; but, rather, there is obtained a balanced combined action that is calculated to resemble the appearance of a small fish moving in the water. Such a realistic illusion has proved to be decidedly successful in luring all fresh water game fish as for instance bass, northern pike, "wall-eyes," crappies and even small pan fish. The form and rotation of the members 7 and 10 in opposite directions will produce an effective disturbance of the water and also effective reflection of light from the highly reflecting surfaces of these members so as to serve as an efficient lure.

The outer member 7, as it rotates, will also serve to protect the inner member 10 and also the hook or hooks 5 and will thus render this lure practically snag-proof and weed-proof.

As may be observed, my present lure permits ready interchangeability of hooks, making possible the use also of rubber skirts, buck tails, feathers or even worms, and minnows.

My screw member 7 does not have any fins or the like projecting therefrom, as have been provided in some prior devices of the spoon or spinner type, and thus my screw member is free of any such resistance to its rotation. The edges of the screw member 7 will cut through the water and there will be obtained a greater rapidity of rotative movement of the same and correspondingly greater disturbance of the water. Also, since my form of screw member 7 reduces the resistance to its rotation, it requires less force to propel the same through the water and hence can be retrieved more easily and more rapidly and with less wear upon the line and reel. This device is capable of being used for casting, trolling or still fishing with the advantages above noted and others that will suggest themselves to those who are skilled in the art to which this invention relates.

What I claim is:

1. A fishing lure comprising a rigid shaft adapted to have a fishing line secured to one end thereof and a fish hook secured to the other end thereof, said shaft having rotatably mounted thereon two spinners, one of said spinners comprising a continuous band of sheet material having a cross sectional configuration of substantially pear-shape and having aligned openings in opposite parts thereof for rotatably mounting the said one spinner on said shaft, said one spinner having its smaller end located forwardly and its forward end portions on opposite sides of said shaft having twists in the nature of a screw means, the longitudinal axes of said portions being at an acute angle to each other, said one spinner at its rear end defining substantially half the curve of an ellipse and being symmetrically arranged on opposite sides of said shaft, the other spinner being slidably mounted on said shaft and located within said first spinner and in normal use having its longitudinal axis substantially in line with the ends of the elliptical portion of said one spinner and being so formed that when said other spinner is in the latter location it is adapted to rotate in the opposite direction to that of said first spinner.

2. The same structure as recited in claim 1 hereof and in which the forward end portion of said first spinner constitutes a stop for said other spinner in the event that said other spinner moves to a position within the forward end portion of said first spinner.

3. In a device of the class described, a spinner comprising a continuous endless band of sheet material having a cross sectional configuration of substantially pear-shape and having aligned openings in opposite parts thereof for rotatably mounting the same upon a shaft with the smaller end thereof located forwardly, said spinner at its forward end having twists upon opposite sides of its longitudinal axis in the nature of a screw means, the longitudinal axes of said ends having the twists being at an acute angle to each other, said spinner at its rear end defining substantially half the curve of an ellipse and said half curve being symmetrically arranged upon opposite sides of the longitudinal axis of said spinner.

AURA R. BRADLEY.

References Cited in the file of this patent

UNITED STATES PATENTS

| Number | Name | Date |
|---|---|---|
| 323,111 | Chapman | July 28, 1885 |
| 576,680 | Kittle | Feb. 9, 1897 |
| 839,917 | Chapman | Jan. 1, 1907 |
| 2,191,244 | Wise | Feb. 20, 1940 |
| 2,266,234 | Mitchell | Dec. 16, 1941 |
| 2,482,648 | Brandt | Sept. 20, 1949 |
| 2,507,098 | Fischler | May 9, 1950 |